UNITED STATES PATENT OFFICE.

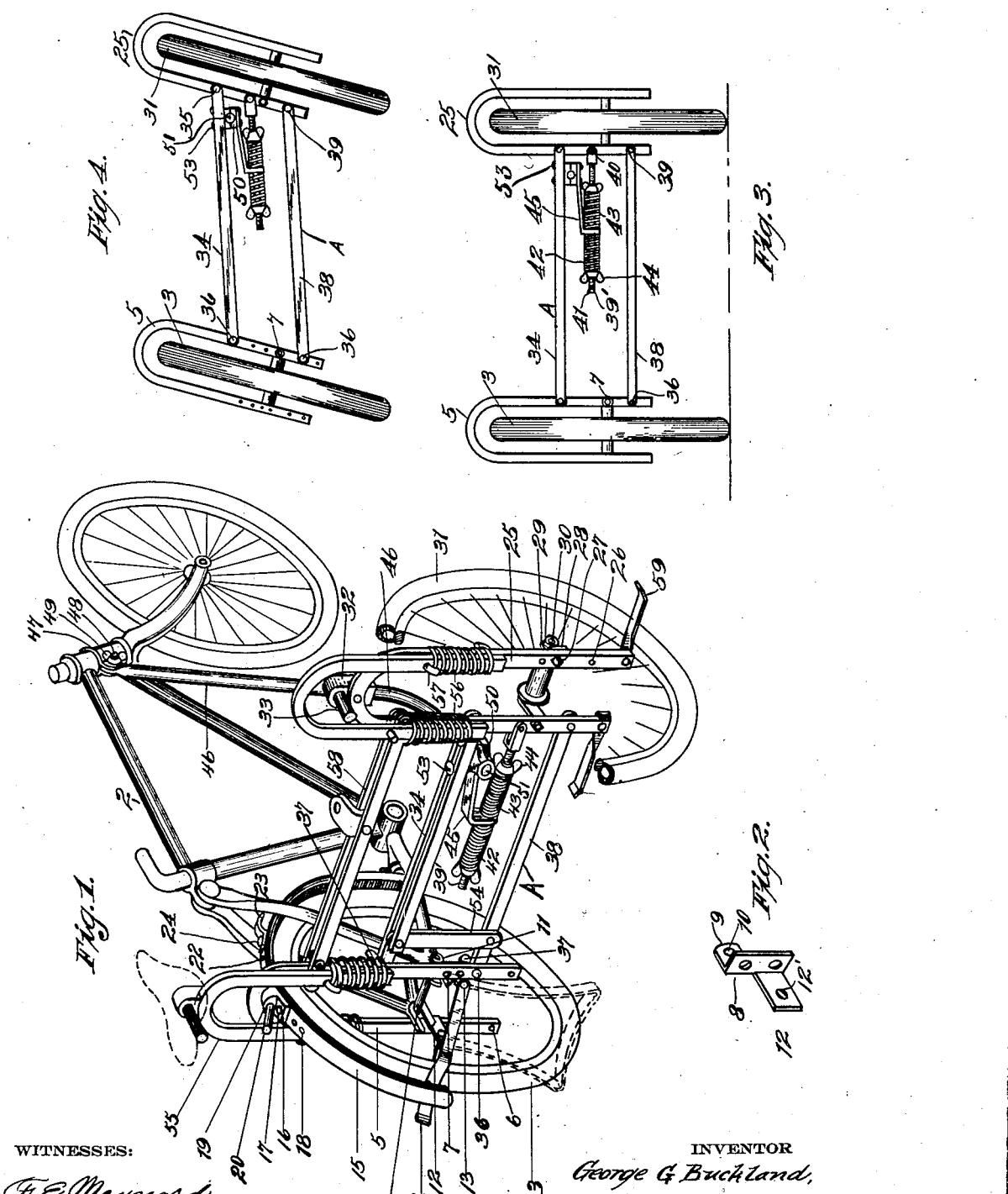

GEORGE G. BUCKLAND, OF SAN FRANCISCO, CALIFORNIA.

BICYCLE SIDE CAR.

1,094,777.   Specification of Letters Patent.   Patented Apr. 28, 1914.

Application filed December 26, 1912. Serial No. 738,531.

*To all whom it may concern:*

Be it known that I, GEORGE G. BUCKLAND, a citizen of the United States, residing in the city and county of San Francisco and State of California, have invented new and useful Improvements in Bicycle Side Cars, of which the following is a specification.

This invention relates to vehicles and particularly to a bicycle or motorcycle adapted for carrying one or more passengers, or parcels, or boxes.

The invention consists of a side car attachment for motorcycles or bicycles having means whereby it may be readily connected to the vehicle, and which has articulated elements enabling the swinging of the wheels of the bicycle with the wheel of the side car in unison with the tilting action of the bicycle when making a turn.

It also comprises details of construction which will be more fully explained by reference to the accompanying drawings in which—

Figure 1 is a perspective view of the side car from the rear looking forward, as attached to a bicycle. Fig. 2 is a perspective of an axle clip. Figs. 3 and 4 are diagrammatic views representing the bicycle and side car in vertical and tilted positions.

I have shown in the illustrated embodiment of my invention a portion 2 of a bicycle frame, which manifestly may be the frame of an ordinary bicycle or motorcycle, in which is mounted the rear wheel 3 on an axle 4, which axle projects sufficiently through the rear braces of the frame 2 to receive means for the attachment of the side car, A.

The side car structure consists of a substantially U-shaped, inverted yoke 5, to the legs of which is attached the rear wheel 3. The legs are perforated, as at 6, for the reception of bolts 7, by means of which clips 8 are attached to the legs of the yoke 5. The clips have forwardly extending ears, perforated, as at 10, to receive the projecting ends of the axle, which, being threaded on the end, will receive a nut or other locking means 11, turnable up against the ears 9 to lock the same on the axle. The series of perforations 6 is provided in the legs of the yoke 5 so as to permit the vertical adjustment of the yoke upon bicycles of different sizes, and also so as to raise a part of the yoke to the desired height above the wheel for the comfortable carrying of passengers.

The clips 8 are also provided with rearwardly extending ears 12, which may be perforated, as at 12', to receive bolts 13, upon which is pivoted a suitable bent frame 14. The arms of the bent frame 14 are of sufficient length so that, when dropped to the ground, they will be sufficient to slightly elevate the rear wheel and vertically support the bicycle so that it will stand alone. When the stand 14 is swung upwardly about its pivot bolts 13, it is held in its uppermost position by engagement with the yieldable end of a mud guard or section 15 which passes upwardly over the wheel of the bicycle and has connected to it a bracket or casting 16. The mud guard 15 is a segment of the usual form for bicycles and has its forward end secured to a cross-bar extending between the rear forks of the machine, a clip 23 curving over the bar and bolted to the guard, as at 24, through holes 22 made in the guard. A bracket or casting 16 is adjustably secured to the guard by bolts, as at 17, passing through holes 18; the thicker or raised portion of the casting 19 has a hole or socket from which projects an arm or bar 20, suitable for the support of a seat or other attachment (not shown), the part 19 of the casting fits snugly in the inner curvature of the yoke 5 and thus maintains the vertical alinement of the yoke.

From the foregoing it will be seen that the load-carrying yoke 5 can be readily and quickly attached to any bicycle or motorcycle by simply mounting it upon the axle of the bicycle and securing the brace member or mud guard 15 to the contiguous part of the bicycle frame; and by mounting a seat or bundle carrier or other attachment on the post 20, at the top of the yoke, I provide a practicable attachment for bicycles.

The side car structure A consists, in addition to the yoke 5, of a similar yoke 25 resembling an inverted U; the depending legs of the yoke 25 being perforated, as at 26, for the reception of bolts 27 by which angle clips 28 may be securely fastened. The angle clips have perforated ears 29 projecting in the plane of the bicycle frame and are adaptable for adjustment upon an axle 30 of a lateral or side wheel 31. The upper curved portion of the outer yoke 25 may be provided with a suitable bracket 32, which has a post 33 whereon may be adjusted the bicycle seat or other adjustment of a character such as may be desired, so that the passenger or parcels may be carried over the side or lateral wheel 31.

An important feature of the present invention is the means connecting the side wheel frame or yoke 25 to the main yoke or frame portion 5 which is mounted on the bicycle axle. I have shown this means as comprising in the present instance an upper rod or link 34, the ends of which are pivotally connected by bolts 35 and 36 to yokes 25 and 5; the bolts being provided with the wing nut 37 which may be readily screwed upon the bolt 36 which is passed through one of the apertures 7 formed in the side leg of the yoke 5.

Extending parallel to, and at a suitable distance below, the link 34 is another link or other connecting member 38. The connecting member 38 is pivoted to the adjacent leg of the yoke frame 25 by means of a bolt 39; the other end of the lower link 38 being connected to the lower portion of the adjacent leg of the yoke or frame 5, carried on the axle of the bicycle. This lower member is connected to the frame in a manner similar to the upper parallel link 34 by the use of a similar wing nut 37, engageable with its respective bolt 36 insertible through one of the holes in the yoke 5. By connecting the upper parallel link 34 to the frames 5 and 25, above their jointure with the axles of the wheels 3 and 31, and by connecting the lower parallel link 38, below the jointure of the frames 5 and 25, with the axles of the wheels, whenever the vehicle is steered in one direction or the other to make a turn, the wheels and their respective frames will tilt simultaneously and parallelly. This tilting motion is positively controlled by the parallel link structure 34—38 which substantially, though flexibly, connects, and may be placed at any location upon, yokes 5 and 25.

One of the advantages of my present construction is that, since I connect the wheel yoke 5 directly to the axle of the bicycle, I eliminate the transmission to the frame of the bicycle twisting and distorting strains which will be engendered if the side wheel apparatus were connected directly to the frame structure instead of to the axle of the wheel of the bicycle.

For the purpose of automatically righting the bicycle and the side seat or side car when the vehicle is again steered into a straight course, and also for the purpose of measurably counteracting the tendency of the vehicle to tilt excessively when making curves, I attach to the side car structure a counterbalancing and automatically righting tension device which consists of a rod 39', pivotally connected by a bolt 40 to the inner leg of the yoke frame 25 of the side wheel. The pivot 40 is positioned somewhat above the fastening device 28 by which this leg is attached to the axle of the side wheel 31, or, if convenient, elsewhere. Upon the inwardly projecting portion of the rod 39', which I have shown as screw threaded practically throughout its length, as at 41, are mounted springs 42—43 adjustable with variable pressure to oppose each other by means of wing nuts 44. The contiguous or inner ends of the springs 42—43 bear on the adjacent side of an arm 45 which is rigidly secured to one or the other of the parallel links, (in this case the upper link 34).

Any suitable means may be employed for attaching the rigid arm 45 to the parallel link 34, and I provide a device which has not only the function of providing an attachment for these related members, but which also provides a means for supporting and clamping a reach and brace rod 46. The rod 46 extends forwardly and is readily attachable to and detachable from the head post or portion of the bicycle frame 2 by means of a band 47, adapted to embrace the frame, and which engages the adjacent end of the reach rod 46; the parts being secured by a bolt 48, on which is adjustable a wing nut 49, whereby the parts can be quickly and easily assembled and disassembled by the operator when he desires to remove the side frame and wheel from the yoke 5.

The device for attaching the arm 45 and the reach rod 46 to the parallel frame member 34 consists of a two-part clamp or box 50 having a longitudinal aperture or seat portion 51 for the contiguous end of the reach rod 46. The box 50 has transverse openings or perforations for the reception of locking bolts 53 which project downwardly and upon which is mounted the arm 45. By screwing up the bolts 53, the arm 45 is held tightly against the box 50 and this in turn is closed to firmly embrace the reach rod 46; the upper ends of the bolts engaging the link 34. The parallel frame members 34—38 may be transversely connected by a brace link 54, which in the present instance is shown as adjusted upon the links 34—38 adjacent to and paralleling the contiguous leg of the yoke frame 5.

While the yokes 5 and 25 provide direct means of support for seats or other attachments for carrying bundles desired, I also provide carriers in the form of inverted U-shaped frames 55, of suitable proportions, the legs of which, when adjusted upon the frame members 5 and 25, are slidably supported and guided along the same. By introducing springs 56 of sufficient diameter to encompass the overlapping frames 55 and 5, or 55 and 25, as the case may be, and by arranging shoulders of appropriate character, which in the present instance are shown as screws 57, adjusted in the legs of the frame 55, these shoulders or devices bear upon the upper part of the springs 56. The lower ends of the springs 56 are supported on the relatively stationary frame members 5—25. By the provision of these supplemental seat carriers or frames 55 I provide a comfortable support for passengers when the seats have been adjusted on the upper portions of the carriers. A further means for the carrying of passengers or parcels is provided by mounting upon the upper ends of the cushion springs 56, which surround the adjacent inner legs of the frames 5 and 25, a cross bar 58, the ends of which straddle the frames 5 and 25 so as to be guided thereby while supported on the springs 56. A passenger seat or a basket or receptacle for parcels may be detachably connected to the carrier bar 58; although this bar may be eliminated, if desired, and the seat or bundle carrier fastened directly to the upper parallel link 34. The lower portions of the yoke members 5 and 25 may have attached to them foot rests 59 for the support of the feet of passengers when riding a supplemental seat.

From the foregoing it will be seen that the side frame structure, consisting of the reach rod 46 and the side wheel frame 25 with its attachments consisting of the parallel members 34—38, may all be very quickly and easily disconnected from the yoke 5, which is secured to the axle of the bicycle, by simply unscrewing the thumb nut 49 on the reach rod and the upper and lower thumb nuts 37 which connect the parallel members to the yoke 5. The disconnection and removal of the side car from the yoke 5 does not affect the function and means of connection of this member whatever, this being mounted directly upon the rear axle 4 of the bicycle or motorcycle. Upon this yoke 5 is supported the bicycle stand 14 which can be lowered whenever desired to maintain the bicycle in a vertical position, and in the event of being attached to a motorcycle, a portion of the load of the motorcycle is removed when the stand 14 is dropped for engagement with the roadway or surface.

Since I mount the yoke 5 of my apparatus directly onto an axle 4 of the bicycle and sustain the yoke in its vertical or upright position by means of the guard 15, with its fastening device 23, which is engageable with a contiguous portion of the frame, the frame of the bicycle is protected from destructive strains which would be encountered by the direct attachment of a supplemental structure. I also avoid the necessity of drilling, machining, altering, or in any ways changing the bicycle frame whatever, since the parts of my apparatus are designed to be complemental with the standard structure of the bicycle or motorcycle. As before stated, the side frame and wheel are supported by the yoke 5 and readily connected thereto by simple bolts called "thumb screws" which can be readily removed so that the side frame may be disconnected.

Having thus described my invention, what I claim and desire to secure by Letters Patent is—

1. A side car attachment for bicycles or motor-cycles consisting of two substantially inverted U-shaped yokes, clips adjustable upon said yokes having ears for mounting one yoke upon an axle of the bicycle, a side wheel mounted within the other of said yokes, and parallel pivotal connections between the adjacent legs of the yokes.

2. A side car attachment for bicycles or motor-cycles consisting of two substantially U-shaped inverted yokes, clips adjustable upon said yokes having ears for mounting one yoke upon an axle of the bicycle, a side wheel mounted within the other of said yokes, parallel pivotal connections between the adjacent legs of the yokes, and automatic means for normally and yieldably maintaining said yokes in a substantially vertical position.

3. A side car attachment for bicycles or motor-cycles consisting of yokes, one of which is adjustable upon an axle of the bicycle, a side wheel upon which the other yoke is adjustable, means for maintaining said yokes in a substantially parallel relation, and a reach rod connecting said means to the forward part of the bicycle frame.

4. A side car attachment for bicycles or motor-cycles consisting of yokes, one of which is adjustable upon an axle of the bicycle, a side wheel upon which the other yoke is adjustable, means for maintaining said yokes in a substantially parallel relation, a reach rod connecting said means to the forward part of the bicycle frame, and a variable tension device automatically counteracting the tilting action of said means when the vehicle is making a turn.

5. A side car attachment for bicycles or the like consisting of a side wheel, a yoke shaped frame adjustable upon the axle of the wheel, means connecting the yoke with the bicycle and maintaining it in a substantially parallel relation thereto, and a reach rod having one end connected to the frame adjacent to the said wheel and the forward part connecting with the front of the bicycle frame.

6. A side car attachment for bicycles or the like consisting of a side wheel, a yoke frame adjustable upon the axle of the wheel, means connecting said frame with the bicycle for maintaining it in a substantially parallel relation thereto, said means consisting of a pair of substantially parallel links pivoted to the adjacent leg of said yoke frame and pivotally connected to a part on the bicycle, and a reach rod having its rear end secured to one of the parallel links adjacent to the side wheel and its front end to the bicycle steering head.

7. A side car attachment for bicycles or the like consisting of a side wheel, yoke frames adjustable upon the axle of the wheel and upon the bicycle axle respectively, means connecting the two frames and maintaining them in a substantially parallel relation, said means consisting of a pair of substantially parallel links pivoted to the inner legs of said frames, an automatic, adjustable device normally resisting the tilting action of the side wheel frame, and a diagonal reach rod extending from the bicycle steering head to one of the parallel links adjacent to the side wheel yoke.

8. A side car attachment for bicycles or the like consisting of a side wheel, an inverted yoke, a second inverted yoke adjustably mounted upon the rear axle of the bicycle, transversely projecting substantially parallel links pivotally joining said yoke members for parallel tilting motion, a reach rod connecting the upper of said links to the bicycle steering head, an attachment carrying device mounted upon the upper portions of said yoke frames, and an automatically yieldable righting device connecting one of said links with one of the legs of the side wheel frame for yieldably resisting tilting action of the vehicle wheels.

9. A tandem and side car attachment for bicycles or the like comprising a side wheel, an inverted yoke frame adjustable upon the axle thereof, an inverted yoke frame adjustable upon an axle of the bicycle, a plurality of transverse links, one above the other, pivotally connecting said yoke frames for maintaining them in parallel relation, slidable attachment carrying members, the legs of which coincide with and are supported by the legs of said yoke frames, and cushions interposed between said yoke frames and said members.

10. A tandem and side car attachment for bicycles or the like, comprising a side wheel, an inverted yoke frame adjustable upon the axle thereof, an inverted yoke frame adjustable upon an axle of the bicycle, a plurality of transverse links pivotally connecting said yoke frames for maintaining them in parallel relation, slidable attachment-carrying members, the legs of which coincide with and are supported by the legs of said yoke frames, cushions interposed between said yoke frames and said members, and a transverse bar or carrier attachment extending between the yokes and movable with the cushions.

11. A bicycle attachment consisting of inverted U-shaped yokes, one of which is adjustably and detachably connected with the rear bicycle axle, and a side wheel with which the second yoke is similarly connected, spring supported carrier frames slidably guided upon the yokes, and a horizontal connecting bar, parallel bars pivotally connecting the yokes, and a tilt-limiting and returning device comprising supported extensible and compressible springs parallel with and between the parallel yoke connecting bars, an arm having one end operatively connected with the springs and the other fixed to one of said yoke connecting bars.

In testimony whereof I have hereunto set my hand in the presence of two subscribing witnesses.

GEORGE G. BUCKLAND.

Witnesses:
JOHN H. HERRING,
W. W. HEALEY.